United States Patent Office 3,429,525
Patented Feb. 25, 1969

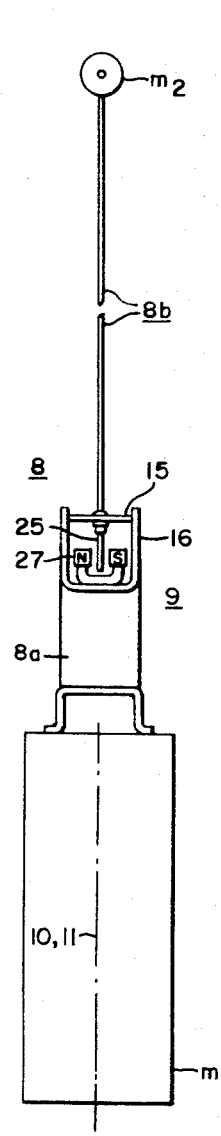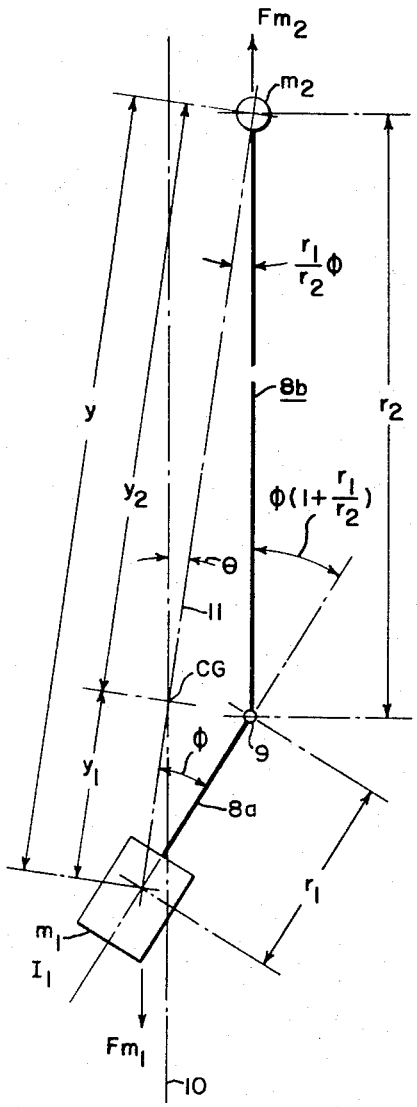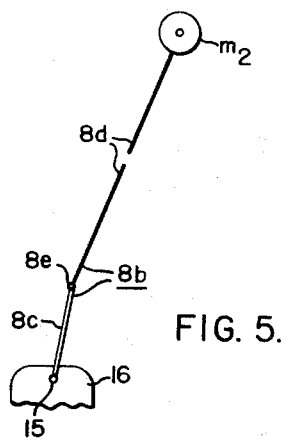
FIG. 1.
FIG. 2.
FIG. 5.
INVENTOR
Frank C. Rushing

3,429,525
SATELLITE ORIENTATION APPARATUS
Frank C. Rushing, Ellicott City, Md., assignor to Westinghouse Electric Corporation, Pittsburgh, Pa., a corporation of Pennsylvania
Filed Sept. 24, 1965, Ser. No. 490,017
U.S. Cl. 244—1                    2 Claims
Int. Cl. B64c 39/02

ABSTRACT OF THE DISCLOSURE

Gravity gradient orientation apparatus for an orbiting satellite, employing an elongated erecting means, in form of a rod or cable, fastened to the satellite for alignment with the local vertical by way of a single-axis hinge with its axis angulated between the pitch and roll planes of the satellite, and damping means operated by relative angular motion at the hinge to remove librational energy from angular motion of the satellite in the pitch, roll and yaw planes.

---

Figure 4A:
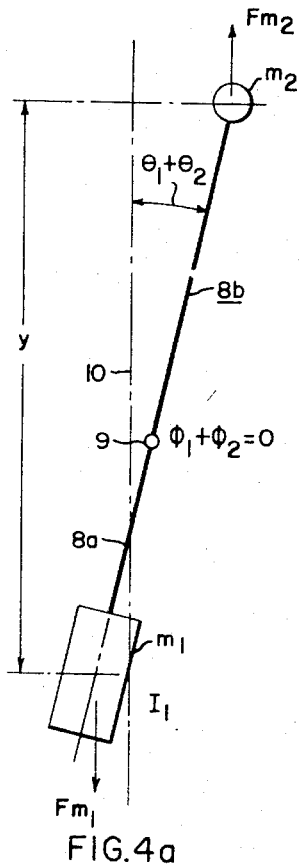

It has been proposed heretofore to employ an erecting member or members in the form of thin-walled rigid tubes attached to the satellite by a universal type hinge and extending outward from the satellite along a local vertical line nominally passing through the center of gravity of the satellite body to create gravity gradient forces for orienting such body relative to a local vertical, together with two shorter, mutually-perpendicular and pivotally-supported thin-walled, rigid tubes and damping means associated with such universal type hinge.

In contrast to such prior art gravity gradient orientation system, even though characterized by a certain degree of simplicity, it is a prime object of the present invention to provide a simplified satellite orientation system of the type which employs gravity gradient forces.

Other objects, features, and advantages of the present invention will become apparent from the following description of an illustrative embodiment of such invention when taken in connection with the accompanying drawings, in which:

FIG. 1 illustrates a typical satellite incorporating the present invention;

FIGS. 2, 3a, 3b, 4a, 4b and 4c schematically illustrate the principles of operation of the hinged mast construction embodied in the present invention, and FIG. 5 illustrates an alternate construction of such hinged mast.

FIG. 1 shows a schematic view of a satellite in the orbital plane. The satellite main body $m_1$ is represented and may have its mass suitably distributed or include other suitably coupled auxiliary masses (not shown) within as part of it to give the system different moments of inertia about different axes and cause it to line up along the orbital path. An erecting mass $m_2$ is separated from body $m_1$ by a mast 8 having sections 8a and 8b which are $r_1+r_2$ long, respectively, as represented in FIG. 2. The body $m_1$ has a moment of inertia $I_1$ about its own CG. In accord with a prime feature of the invention, mast sections 8a and 8b are joined by a single-axis pivotal connecting means 9 or hinge means, which can be a plain single-shaft hinge with no mechanical spring restoring force; or it can be elastic. The plain single-shaft hinge, which is the simplest, is used as the basis for further explanation. The concentrated mass $m_2$ is shown for simplicity of explanation; and while it can be used as shown it could in effect be replaced by a length of mast.

This hinged system has bending at the hinge when it librates. Furthermore, by locating the hinge in the optimum place and suitably proportioning the masses and inertias, a relatively large annular motion to operate a damper can be produced at the hinge.

Referring to FIG. 2, for an analysis of how bending is produced around the hinge 9, assume that hinge 9 is not bent and that the mast sections 8a and 8b are aligned with the common center line 11 which passes through the body $m_1$, mass $m_2$ and the system CG, and that center line 11 is at the angle $\theta$, which is the angle between the local vertical 10 and line 11. In this analysis as shown in FIG. 2, other angles are identified as $\phi$, the angle between the line 11 and mast section 8a;

$$\frac{r_1}{r_2}\phi$$

the angle between mast section 8b and a projection of $$\phi\left(1+\frac{r_1}{r_2}\right)$$

the angle between mast section 8b and a projection of mast section 8a. While assuming that the hinge 9 is not bent, assume further that $\theta$ is increasing, and that the gravity gradient forces $Fm_1$ and $Fm_2$ are restraining the motion. Then the velocities of $m_1$ and $m_2$ will decrease, but under these conditions there is nothing to restrain the angular motion of $I_1$ around it CG. So $I_1$ will continue to rotate until the angle $$\phi\left(1+\frac{r_1}{r_2}\right)$$

increase enough for the gravity gradient forces to produce a moment on $I_1$ to restain its angular motion.

A simplified version of the motion of this system (in the pitch mode) can be described by two dynamic equations: (assume small amplitudes were sin $\theta=\theta$ and sin $\phi=\phi$; assume that any other coupled masses are included in $m_1$; assume the inertia of the $m_2$ body about its own CG to be negligible; assume that the net gravity gradient moments within the individual bodies are negligible, and assume $y_1$ and $y_2$ to be constant):

(1) External couples balanced by inertia moments, all taken about the system CG:

$$-Fy\theta=(m_1y_1^2+m_2y_2^2)\ddot{\theta}+I_1(\ddot{\theta}+I_1(\ddot{\theta}+\ddot{\phi}))$$

(2) Inertia moment of $I_1$ balanced by moment produced by gravity gradient force at bent hinge:

$$I_1(\ddot{\theta}+\ddot{\phi})=-F\phi\left(1+\frac{r_1}{r_2}\right)r_1$$

where $\ddot{\theta}$ and $\ddot{\phi}$ represent second order derivatives with respect to time. Let $I_G=m_1y_1^2+m_2y_2^2$ and let $$R=\left(1+\frac{r_1}{r_2}\right)$$

Solving these two equations gives:
$$I_1I_G\omega_4-(FyI_1+Fr_1RI_G+Fr_1RI_1)\omega^2+F^2r_1Ry=0$$
Where $\omega$ is librational natural frequency, radians/second, and it gives:

$$\frac{\phi_o}{\theta_o}=\frac{-1}{\dfrac{Fr_1R}{I_1\omega^2}}$$

Thus, there are two natural frequencies which give two relationships of $\phi_o/\theta_o$.

For a specific case where:
$m_1=.744\#$ sec. $^2$/in. (weight=286 lbs.)
$m_2=.052\#$ sec. $^2$/in. (weight=20 lbs.)
$I_1=240\#$ sec. $^2$/in.
$y=744$ inches
$r_1=12$ inches
$r_2=632$ inches (61 ft.)
$I_G=2.65\times10^4\#$ sec. 2 in.
  (calculated for above masses and geometry)
Altitude=6000 nautical miles From known orbital mechanics calculation procedures it is computed that this satellite will have an orbital period of 6.32 hours and effective gravity gradient forces of $F = 6.4 \times 10^{-4}$ pounds on $m_1$ and $m_2$.

The calculations give the two librational natural frequencies $\omega_1$ and $\omega_2$ with configurations fixed by the ratio $\phi_0/\theta_0$:

$\omega_1 = 0.575 \times 10^{-3}$ radians/sec.
$P_1 = 3.05$ hours per cycle $$\frac{\phi_{o_1}}{\theta_{o_1}} = -50.5$$

$\omega_2 = 0.421 \times 10^{-3}$ radians/sec.
$P_2 = 4.12$ hours per cycle $$\frac{\phi_{o_2}}{\theta_{o_2}} = 1.22$$

Figure 3A:
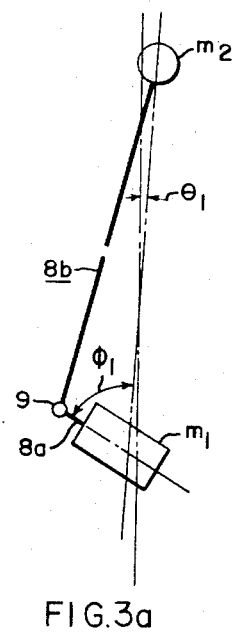
Figure 3B:
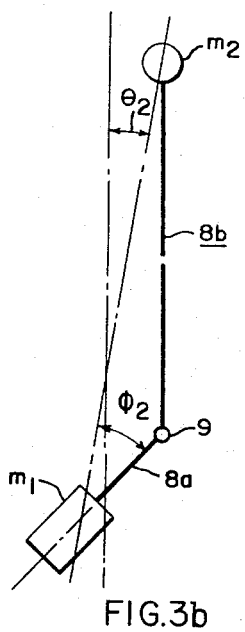

Thus, the configurations of these two natural modes of vibration will be as shown in FIGS. 3a and 3b. Both of these configurations give substantial motion at the hinge 9 during the system libration, thereby assisting in the task of applying a damper to remove energy from the librational motion.

The "yaw" and "roll" motions can be handled similar to the "pitch" mode described above, taking into account their gyroscopic coupling. Since roll motion is produced by "yaw," a damping provision for "roll" will cover both. One way to handle it as proposed heretofore has been to use a universal joint having two axes and dampers. The arrangement proposed herein is to use a single-axis hinge with its axis at an angle between the "pitch" and "roll" planes. Then motion in any one of the three planes of motion will operate the joint and its damper.

The bearing load at the joint is essentially only the gravity gradient force. As the amplitudes of libration approach zero, friction torques and angular errors are negligibly small even with a pessimistic assumption of the coefficient of friction.

The physical performance of the hinged system will be clarified by explanation of the configurations of FIG. 4. After a major perturbation such as during the launch and erection process, assume that the satellite body $m_1$ is at an angle $\theta_1 + \theta_2$ to the vertical 10, its mast 8 is erected, there is zero rate of change of $\theta_1 + \theta_2$, and $\phi_1 + \phi_2 = 0$. The gravity gradient forces, $F_m$, and $F_{m2}$, will exist and the mass $m_2$ will immediately start swinging to the left with mass $m_1$ moving to the right. The joint 9 will start to bend causing a build-up moment on the inertia $I_1$ to change its angle with the vertical. With a damper around the hinge, the librational energy of the system which is $\frac{1}{2} Fy(\theta_1+\theta_2)^2$ for small angles will immediately start being dissipated.

Figure 4B:
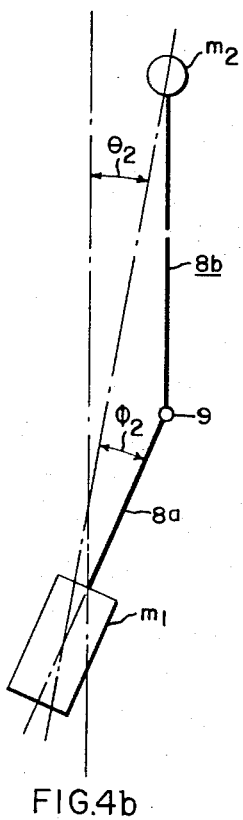
Figure 4C:
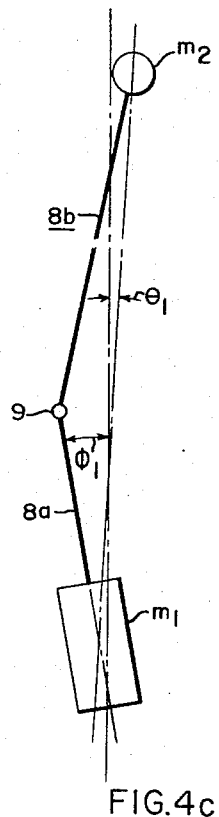

Basically it can be viewed in terms of its two principal modes of motion where the visible configuration FIG. 4a is made up of the configuration of FIG. 4b and 4c which are also at the extremes of their motions and have no librational velocity at the instant shown. Then, due to gravity gradient forces, the mass $m_2$ will start moving toward the left, and the mass $m_1$ will start moving toward the right, as dictated by both modes. The angular motion of mass $m_1$ will start moving angularly as dictated by the two modes of motion. By the time $m_2$ reaches the vertical there will be substantial angular motion at the hinge, where the damper is located.

The mode of FIG. 4c, for the illustration used, possesses about 20% of the total energy. Actually the greatest store of energy for all of the motion is in the motion of $m_2$. The mode of FIG. 4c has a comparatively high frequency and it has large relative motions at the damper all of which facilitates removing its energy with a damper at the hinge.

The mode of FIG. 4b for the illustration used has a lower natural frequency, being comparable to what it would be without the hinge, and it contains a majority of the energy. It also has large relative motion at the hinge which facilitates removal of librational energy.

To remove energy with a damper, not only is motion required, but damper dissipative torque produced by the motion is required. The greater the torque and motion, the more rapidly will energy be removed. But the useful torque capability is limited by the inertia torque to react against the damper torque and operate the damper. In the illustration of FIGS. 4a, 4b, and 4c, the moments of inertia of the two hinged sections about the hinge produce reactions to the damper torque. The advantage over former systems is that weight and inertia already provided for gravity gradient stabilization are applied to produce reactions to the damper torque; while in the previous systems additional pivoted rods and weights are required to operate the damper or dampers.

The hinge 9 construction of the present invention may simply be as shown in FIG. 1 in the form a hinge having a rotary shaft 15 journaled in a yoke member 16 fixed to the mast part 8a, which may be rigid and in the form of bent tubing attached to the upper part of the satellite body $m_1$. The mast part 8b may take the form of a continuous rigid tube as shown in FIG. 1 or of a crank arm portion 8c actuated by a flexible cable portion 8d attached thereto at 8e, as shown in FIG. 5. The mast is stored by means (not shown) during launching of the satellite and is unfurled in space following such launching and when the satellite is in orbit. From the showing in FIG. 1, and in view of the preceding description of the principles of operation of the present invention, it will be seen that the mast section 8b, considered as a rigid tube attached to the shaft 15, is free to pivot about the axis of such shaft and relative to the yoke 16 and thereby to the mast section 8a.

To absorb energy from the relative angular movement between the mast sections 8a and 8b, damping means is provided which is affiliated with the pivotal connecting means interposed between such mast sections. Such damping means may take the form of magnetic hysteresis, eddy current, or other suitable form, but for the sake of illustration such means has been exemplified herein in the form of eddy current damping means which, for illustrative purposes as shown in FIG. 1, includes affiliated with each part of the hinge means 9, a loss plate means 25 secured to the shaft 15 to turn therewith, and magnet means 27 attached to yoke 16 including opposite poles between which the loss plate means 25 is moved by turning movement of shaft 15 to generate eddy currents in such loss plate means and develop reaction forces which damp the relative angular motion between the mast parts 8a and 8b, hence between the stabilizing or erecting mass $m_2$ and the vehicle body $m_1$. It will be appreciated that such eddy current damping means as illustrated in FIG. 1, has been so shown in behalf of simplification. In practice such means more probably will include a loss disc and an array of magnets distributed around such disc.

From the foregoing description of the principles of operation of the present invention, it will be apparent that by virtue of the construction of the hinge means 9 as shown in FIG. 1, in conjunction with the damping means affiliated therewith, the satellite body $m_1$ will be stabilized both in pitch and roll, as well as yaw by virtue of gyroscopic coupling between such modes.

While a particular exemplification of the invention has been described with a certain degree of particularity, it is to be understood that the invention is not necessarily limited to all of the details of construction described and that the appended claims are intended to cover the true spirit and scope of such invention.

I claim as my invention:

1. Gravity gradient orientation apparatus for a satellite comprising, an elongated erecting means fastened to said satellite for gravity-gradient alignment with the local vertical, a single-axis hinge with its axis in the plane of the pitch and roll axes of the satellite and angulated therebetween permitting relative angular movement between at least a portion of said elongated erecting means and said satellite, and damping means operated by such relative angular movement.

2. Satellite orientation apparatus as set forth in claim 1, wherein said elongated erecting means includes a remotely-extending portion in flexible cable-like form, and said damping means is effectively coupled to such portion via a lever arm.

References Cited
UNITED STATES PATENTS

| | | | |
|---|---|---|---|
| 3,168,263 | 2/1965 | Kamm | 244—1 |
| 3,241,142 | 3/1966 | Raabe | 244—1 |
| 3,268,183 | 8/1966 | Etkin | 244—1 |
| 3,270,984 | 9/1966 | Rice | 244—1 |
| 3,282,532 | 11/1966 | Tinling et al. | 244—1 |

FERGUS S. MIDDLETON, *Primary Examiner.*